United States Patent [19]

Heinl

[11] Patent Number: 4,502,697
[45] Date of Patent: Mar. 5, 1985

[54] COMPACT INTEGRATED FACE SEAL UNIT

[75] Inventor: Werner Heinl, Burscheid, Fed. Rep. of Germany

[73] Assignee: Goetze AG, Fed. Rep. of Germany

[21] Appl. No.: 611,153

[22] Filed: May 17, 1984

[30] Foreign Application Priority Data

May 18, 1983 [DE] Fed. Rep. of Germany ....... 3318078

[51] Int. Cl.³ ............................................... F16J 15/38
[52] U.S. Cl. ........................................ 277/41; 277/12; 277/50; 277/81 R; 277/166
[58] Field of Search ............................ 277/38–43, 277/12, 32, 50, 81 R, 84, 166

[56] References Cited

U.S. PATENT DOCUMENTS

| | | | |
|---|---|---|---|
| 2,444,713 | 7/1948 | Solari | 277/40 |
| 2,722,439 | 11/1955 | Brummer et al. | 277/42 |
| 3,131,956 | 5/1964 | Bailey | 277/41 X |
| 3,291,492 | 12/1966 | Becker | 277/42 |
| 4,095,807 | 6/1978 | Jandt et al. | 277/40 |
| 4,136,885 | 1/1979 | Uhrner | 277/42 X |

FOREIGN PATENT DOCUMENTS

| | | |
|---|---|---|
| 2623583 | 12/1977 | Fed. Rep. of Germany . |
| 2729928 | 1/1980 | Fed. Rep. of Germany . |
| 1129609 | 9/1956 | France ................................ 277/42 |

Primary Examiner—Robert S. Ward
Attorney, Agent, or Firm—Spencer & Frank

[57] ABSTRACT

A sealing arrangement for a machine having a shaft. The arrangement includes a hub constructed to be seated on the shaft, an impeller wheel connected to the hub, a counter-ring disposed axially of the impeller wheel and cooperating with the impeller wheel, a slide ring seal disposed axially of the counter-ring with the counter-ring being located between the slide ring seal and the impeller wheel, and a connecting element comprised of the same material as, and integral with, the impeller wheel. The connecting element presents a circumferential face of the sealing arrangement and extends in the axial direction of the impeller wheel, axially holding together the impeller wheel, hub, counter-ring and slide ring seal.

8 Claims, 3 Drawing Figures

4,502,697

COMPACT INTEGRATED FACE SEAL UNIT

BACKGROUND OF THE INVENTION

The present invention relates to a sealing arrangement for a machine having a shaft, particularly for a fluid flow pump. Such a sealing arrangement includes an impeller wheel, a counter-ring cooperating with the impeller wheel, a slide ring seal, and a connecting element which holds all the parts together.

German Pat. No. 2,729,928 discloses a centrifugal pump equipped with an integrated sealing unit. An impeller wheel made of steel or fiber reinforced plastic is firmly connected with a hub made of metal, which could be a sintered metal. At the free end of the hub, a counter-ring is disposed through the intermediary of an elastomer body. Starting from the free end of the hub, either a metallic connecting element or a separate connecting element shaped out of the elastomer material of the counter-ring extends axially to behind the slide ring seal. The drawback of this type of structure is that the relatively compact connection of impeller wheel and hub is relatively heavy and is thus rather expensive to produce. Moreover, the counter-ring, which in many cases is made of a brittle material, as for example ceramic, cannot be integrated with the impeller wheel to thus obtain a shorter structural unit. Further, an additional connecting body, be it of elastomer material or metal, is required, and is absolutely necessary to connect the impeller wheel and the hub, respectively, with the slide ring seal so as to form an installable unit.

German Offenlegungsschrift [Laid-Open Patent Application] No. 2,623,583 discloses a circulating pump, particularly a coolant pump for a motor vehicle, in which a slide ring seal, impeller wheel and counter-ring are combined into an installable unit such that the slide ring seal is provided with a housing which includes the counter-ring, and the counter-ring is fixed to the impeller wheel through the intermediary of an elastomer body. The metal impeller wheel here as well is unable to directly accomodate a counter-ring made of a brittle material without requiring the intermediary of an elastomer layer. Moreover, a separate connecting member is again required to obtain the installable unit.

SUMMARY OF THE INVENTION

It is an object of the present invention to design a sealing arrangement such that a relatively lightweight and compact installable unit can be created with the least possible number of parts, and with the axial length of the structure being reduced, inter alia, by the fact that the impeller wheel is able to accommodate a counter-ring made of a brittle material in a connection which will not be destroyed even under extreme operating conditions.

The above and other objects are accomplished by the invention wherein a novel sealing arrangement is provided for a machine having a shaft. The arrangement includes: a hub constructed to be seated on the shaft, an impeller wheel connected to the hub, a counter-ring disposed axially of the impeller wheel and cooperating with the impeller wheel, a slide ring seal disposed axially of the counter-ring with the counter-ring being located between the slide ring seal and the impeller wheel, and a connecting element comprised of the same material as, and integral with the impeller wheel. The connecting element presents a circumferential face of the sealing arrangement and extends in the axial direction of the impeller wheel, axially holding together the impeller wheel, hub, counter-ring and slide ring seal.

For reasons of weight, an impeller wheel made of an elastomer material, hard rubber or plastic is here preferred, with of course the use of light metals, such as aluminum or the like, possibly coated with an elastomer layer, also being possible. This measure, in contradistinction to the prior art, provides a relatively lightweight and, most of all, economically produced sealing unit. If the axial connection is comprised of an elastomer material, the counter-ring may be embedded therein, possibly by way of a corrugated profile so that it is elastically mounted without requiring further components.

A plurality of ways exist to arrest the slide ring seal so that it is secured to the impeller wheel during transport and installation. A preferred variation is to extend the connecting element axially to behind the slide ring seal and to provide at least one preferably circumferential bead in the region of the free end of the connecting element. Thus a snap-in connection is produced in a simple manner for axially fixing or locking in the slide ring seal.

According to another aspect of the invention, the hub which supports the impeller wheel is provided, in the region of the axially extended connecting element, with a projection which has at least one step-wise increase in diameter. For reasons of corrosion prevention, the stepped portion of the hub is then preferably completely enclosed by the elastomer material comprising the impeller wheel and the connecting element. Moreover, the step has the additional advantage that the elastomer material can be bonded better to the metallic, stepped portion of the hub since the bonding surface is enlarged.

For the purpose of providing better clamping of the elastomer material to the larger diameter axial arm of the hub, it is proposed to provide this region with axially extending or inclined cut-outs. Also conceivable are circular or oval recesses.

DESCRIPTION OF THE PREFERRED EMBODIMENT

Figure 1:
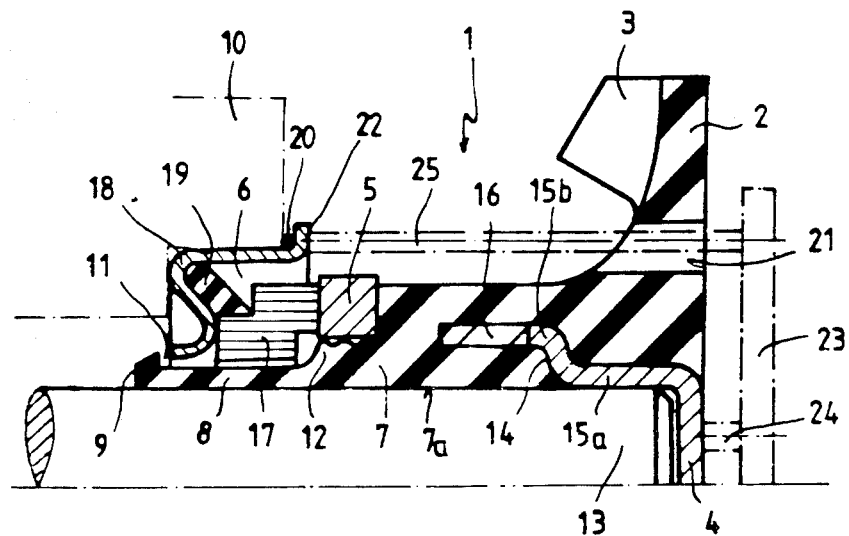
FIG. 1 shows a partial sectional side view of a sealing arrangement according to the invention which is installed on a shaft.

The drawing FIG. 1 shows the upper half of a sealing member 1 in an installed position on a shaft 13. The sealing arrangement 1 includes an impeller wheel 2 made of elastomer material having an axial face from which a blade 3 projects toward a slide ring 17. The arrangement further includes a metallic hub 4, a counter-ring 5, and a slide ring seal 6. According to the present invention, a connecting element 7 is shaped in one piece axially out of the same elastomer material of the impeller wheel 2, i.e. the connecting element 7 is integral with the impeller wheel 2. Connecting element 7 forms a circumferential face 7a and extends axially to behind the slide ring seal 6. In the region of the free end 8 of connecting element 7, a circumferential bead 9 is provided against which the slide ring seal 6 rests during transport and installation. In the installed state, i.e. when slide ring seal 6 has been pressed into a housing 10

(shown in dotted line) of a machine such as a fluid flow pump, an axial gap 11 is created so that slide ring seal 6 has some free play in the axial direction. By way of a corrugated profile 12, the ceramic counter-ring 5 is supported elastically on the extension of connecting element 7.

In the installed state, sealing member 1 is seated on shaft 13, with impeller wheel 2 connected with shaft 13 by way of hub 4 so as to be secure against rotation relative to shaft 13. In order to handle the torque forces generated during operation, hub 4 is provided with a radial step 14 connecting axial arm portions 15a and 15b so as to present an approximately step-shaped profile. Thus, during manufacture, a larger bonding surface is provided for the elastomer material. Moreover, axial arm portion 15b, which is disposed on a larger diameter than axial arm portion 15a, is provided with axially extending or inclined cut-outs 16 to thus realize better clamping of the elastomer material.

The slide seal ring 6 which is connected with the impeller wheel 2 by connecting element 7 consists of the following parts:

A slide ring 17, a casing 18, a first sealing element 19 between casing 18 and slide ring 17 and a second sealing element in form of an O-ring 20 between the radial outer circumference of the casing 18 and the housing 10. The impeller wheel 2 itself shows axial directed recesses 21. These recesses 21 are arranged opposite to a radial extending flange 22 formed out of the casing 18 of the slide ring seal 6.

When installing the sealing arrangement 1 on the shaft 13 an assembling tool 23 with axial extending arms 24,25 will be used. Arms 24 will be brought in contact with hub 4 and arms 25 with the flange 22. The axial forces will be exerted to the assembling tool 23 and the sealing arrangement 1 including the slide ring seal 6 is installed on the shaft 13 and into the housing 10 simultaneously. This is to avoid canting of the slide ring seal 6 especially the slide ring 17 towards the sealing arrangement 1 especially the counter ring 5.

Figure 2:
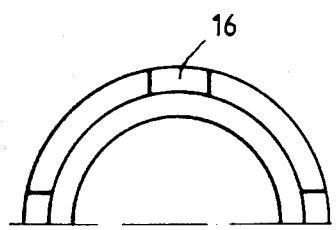
FIGS. 2 and 3 show fragmental views of the metallic hub showing axial and inclined cut-outs which is part of the sealing arrangement of FIG. 1.
Figure 3:
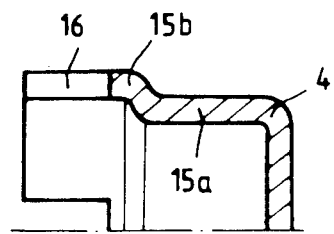

FIGS. 2 and 3 show the hub 4 which is part of the sealing arrangement 1. The axial arm portion 15b which is disposed on a larger diameter than axial arm portion 15a is provided with axially extending or inclined cut-outs to thus realize better clamping of the elastomer material.

It will be understood that the above description of the present invention is susceptible to various modifications, changes and adaptations, and the same are intended to be comprehended within the meaning and range of equivalents of the appended claims.

What is claimed is:

1. A sealing arrangement for a machine having a shaft, comprising:
    a hub constructed to be seated on the shaft;
    an impeller wheel connected to said hub;
    a counter-ring disposed axially of said impeller wheel and cooperating with said impeller wheel;
    a slide ring seal disposed axially of said counter-ring with said counter-ring being located between said slide ring seal and said impeller wheel; and
    a connecting element comprised of the same material as, and integral with said impeller wheel, said connecting element presenting a circumferential face of said sealing arrangement, and extending in the axial direction of said impeller wheel and axially holding together said impeller wheel, hub, counter-ring and slide ring seal.

2. An arrangement as defined in claim 1, wherein said connecting element extends axially beyond said slide ring seal.

3. An arrangement as defined in claim 1, wherein said connecting element has a free end remote from said impeller wheel, and said free end has at least one circumferential bead which presents an axial abutment for said slide ring seal in the direction away from said impeller wheel.

4. An arrangement as defined in claim 1, wherein in the region of said connecting element, said hub has a radial step and first and second axial portions connected by said radial step so that said hub presents an approximately step-shaped profile.

5. An arrangement as defined in claim 4, wherein said second axial portion is remote from said impeller wheel relative to said first axial portion and said second axial portion has a larger diameter than said first axial portion.

6. An arrangement as defined in claim 4, wherein the first and second axial portions of said hub are enclosed completely by the material comprising said impeller wheel and connecting element.

7. An arrangement as defined in claim 6, wherein said second axial portion has a free end and is provided with one of axial and inclined cut-outs.

8. An arrangement as defined in claim 1, wherein said impeller wheel and connecting element are comprised of an elastomer material.

* * * * *